US011821433B2

(12) United States Patent
Iurisci et al.

(10) Patent No.: US 11,821,433 B2
(45) Date of Patent: Nov. 21, 2023

(54) ROTARY MACHINE WITH IMPROVED SHAFT

(71) Applicant: Nuovo Pignone Tecnologie S.r.l., Florence (IT)

(72) Inventors: Giuseppe Iurisci, Florence (IT); Lorenzo Naldi, Florence (IT); Pradeep Kumar Diddi, KA (IN)

(73) Assignee: Nuovo Pignone Tecnologie S.r.l, Florence (IT)

( * ) Notice: Subject to any disclaimer, the term of this patent is extended or adjusted under 35 U.S.C. 154(b) by 1200 days.

(21) Appl. No.: 16/094,585

(22) PCT Filed: Jan. 16, 2017

(86) PCT No.: PCT/EP2017/050786
§ 371 (c)(1),
(2) Date: Oct. 18, 2018

(87) PCT Pub. No.: WO2017/125344
PCT Pub. Date: Jul. 27, 2017

(65) Prior Publication Data
US 2020/0325906 A1 Oct. 15, 2020

(30) Foreign Application Priority Data
Jan. 18, 2016 (IT) .................. 102016000004020

(51) Int. Cl.
*F04D 29/054* (2006.01)
*F04D 25/02* (2006.01)
(Continued)

(52) U.S. Cl.
CPC ......... *F04D 29/054* (2013.01); *F04D 17/122* (2013.01); *F04D 25/02* (2013.01);
(Continued)

(58) Field of Classification Search
CPC ... F04D 17/12–122; F04D 29/053–054; F04D 29/0405; F04D 29/043; F04D 29/044; F16D 1/00
See application file for complete search history.

(56) References Cited

U.S. PATENT DOCUMENTS 1,660,792 A  *  2/1928  Hirth ....................... F16D 1/033
                                                        403/364
4,964,646 A    10/1990  Boster
(Continued)

FOREIGN PATENT DOCUMENTS

DE    41 28 673 C1    8/1992
DE    92 05 772 U1    8/1992
(Continued)

OTHER PUBLICATIONS

Search Report and Opinion issued in connection with corresponding IT Application No. 102016000004020 dated Sep. 16, 2016.
(Continued)

*Primary Examiner* — Eldon T Brockman
*Assistant Examiner* — Andrew J Marien
(74) *Attorney, Agent, or Firm* — Paul Frank + Collins P.C.

(57) ABSTRACT

A rotary machine is disclosed, which includes a rotary shaft having a rotation axis, a first shaft end, and a second shaft end; a first bearing arrangement at the first shaft end; a second bearing arrangement at the second shaft end; a coupling flange mechanically connected to the first shaft end. The coupling flange is mechanically connected to the first shaft end by means of a first axial-contact coupling.

7 Claims, 4 Drawing Sheets

(51) Int. Cl.
F04D 29/051 (2006.01)
F04D 29/053 (2006.01)
F16D 1/076 (2006.01)
F04D 17/12 (2006.01)

(52) U.S. Cl.
CPC ......... *F04D 29/051* (2013.01); *F04D 29/053* (2013.01); *F16D 1/076* (2013.01); *F05B 2240/52* (2013.01); *F05B 2240/60* (2013.01)

(56) References Cited

U.S. PATENT DOCUMENTS

| | | | | |
|---|---|---|---|---|
| 7,144,226 B2* | 12/2006 | Pugnet | ................ | F04D 25/0606 417/244 |
| 2002/0037772 A1* | 3/2002 | Fisch | ...................... | F16D 1/076 464/182 |
| 2013/0136629 A1* | 5/2013 | Maier | ................ | F04D 29/5826 165/122 |
| 2015/0322961 A1* | 11/2015 | Slotman | ................ | F04D 29/054 415/198.1 |
| 2016/0123149 A1* | 5/2016 | Kishi | ...................... | F01D 15/00 415/122.1 |
| 2017/0248151 A1* | 8/2017 | Nelson | .................. | F04D 29/044 |
| 2018/0209427 A1* | 7/2018 | Iurisci | .................... | F25J 1/0087 |
| 2020/0325906 A1* | 10/2020 | Iurisci | .................... | B41F 33/16 |

FOREIGN PATENT DOCUMENTS

| | | |
|---|---|---|
| WO | 2012/166438 A2 | 12/2012 |
| WO | 2015/091436 A1 | 6/2015 |

OTHER PUBLICATIONS

International Search Report and Written Opinion issued in connection with corresponding PCT Application No. PCT/EP2017/050786 dated Apr. 19, 2017.

International Preliminary Report on Patentability issued in connection with corresponding PCT Application No. PCT/EP2017/050786 dated Jul. 24, 2018.

* cited by examiner

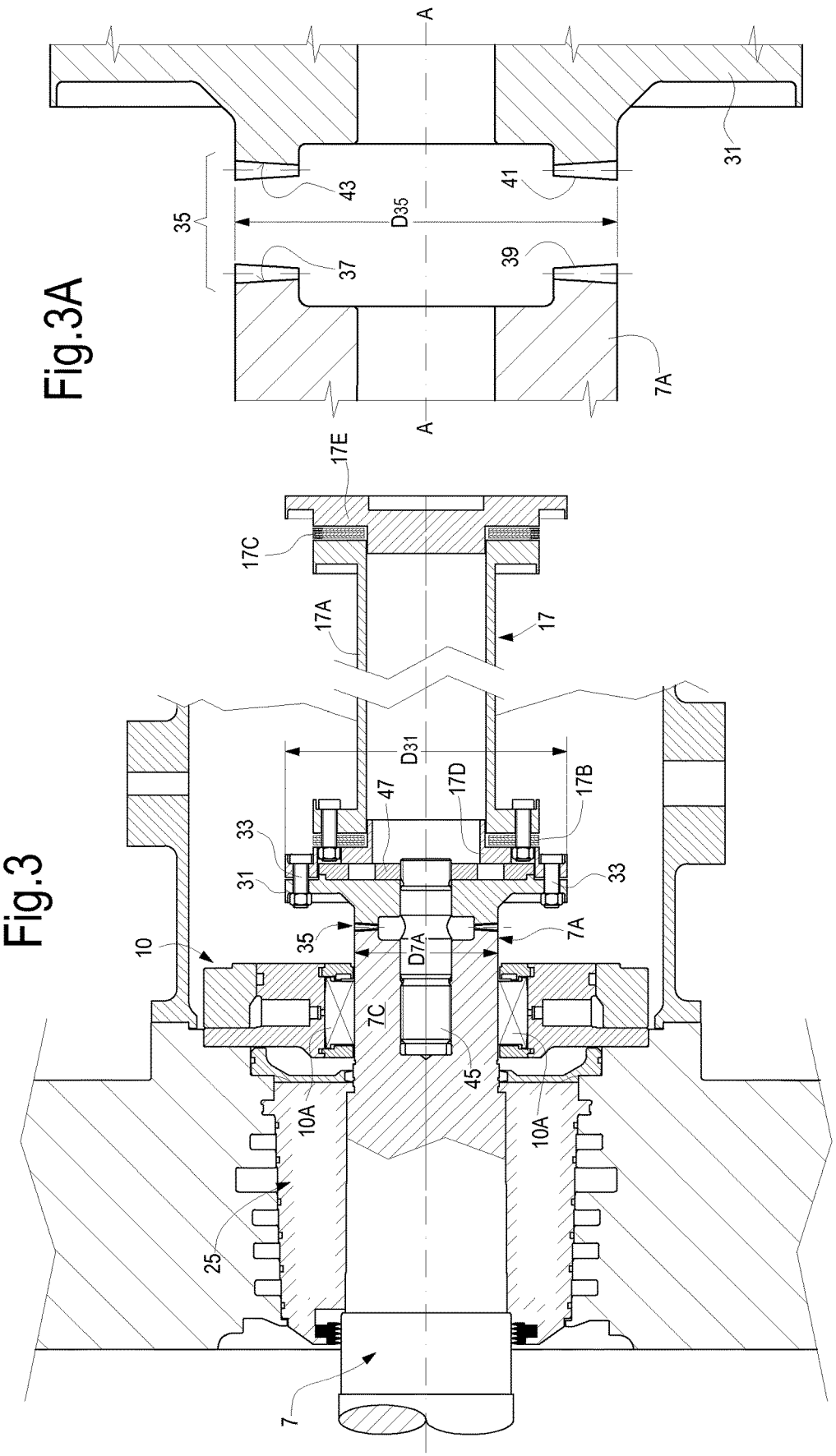

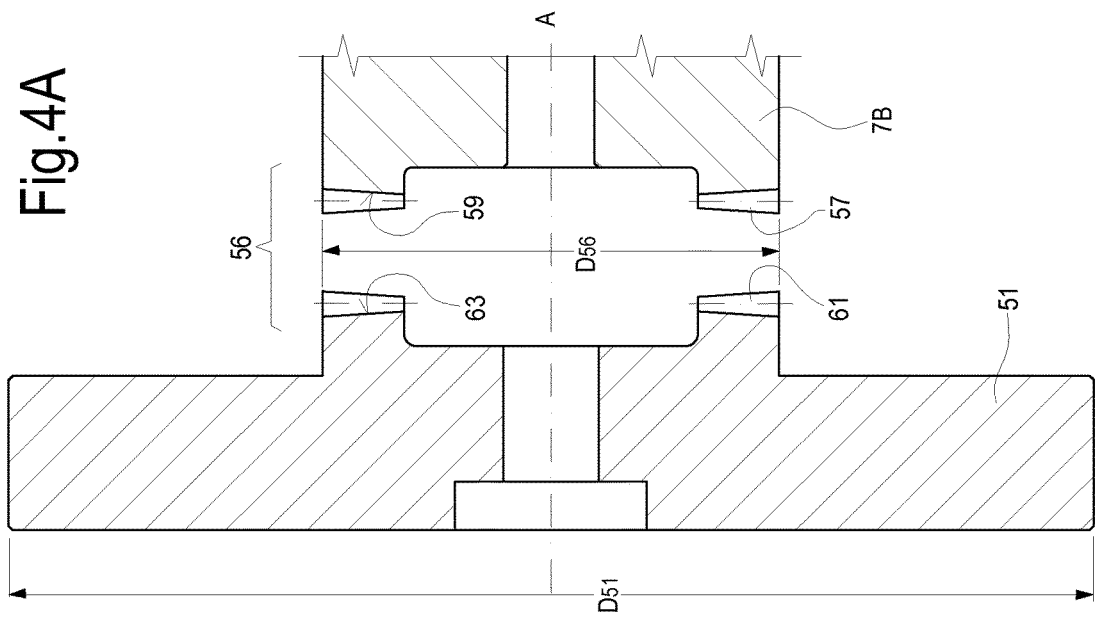
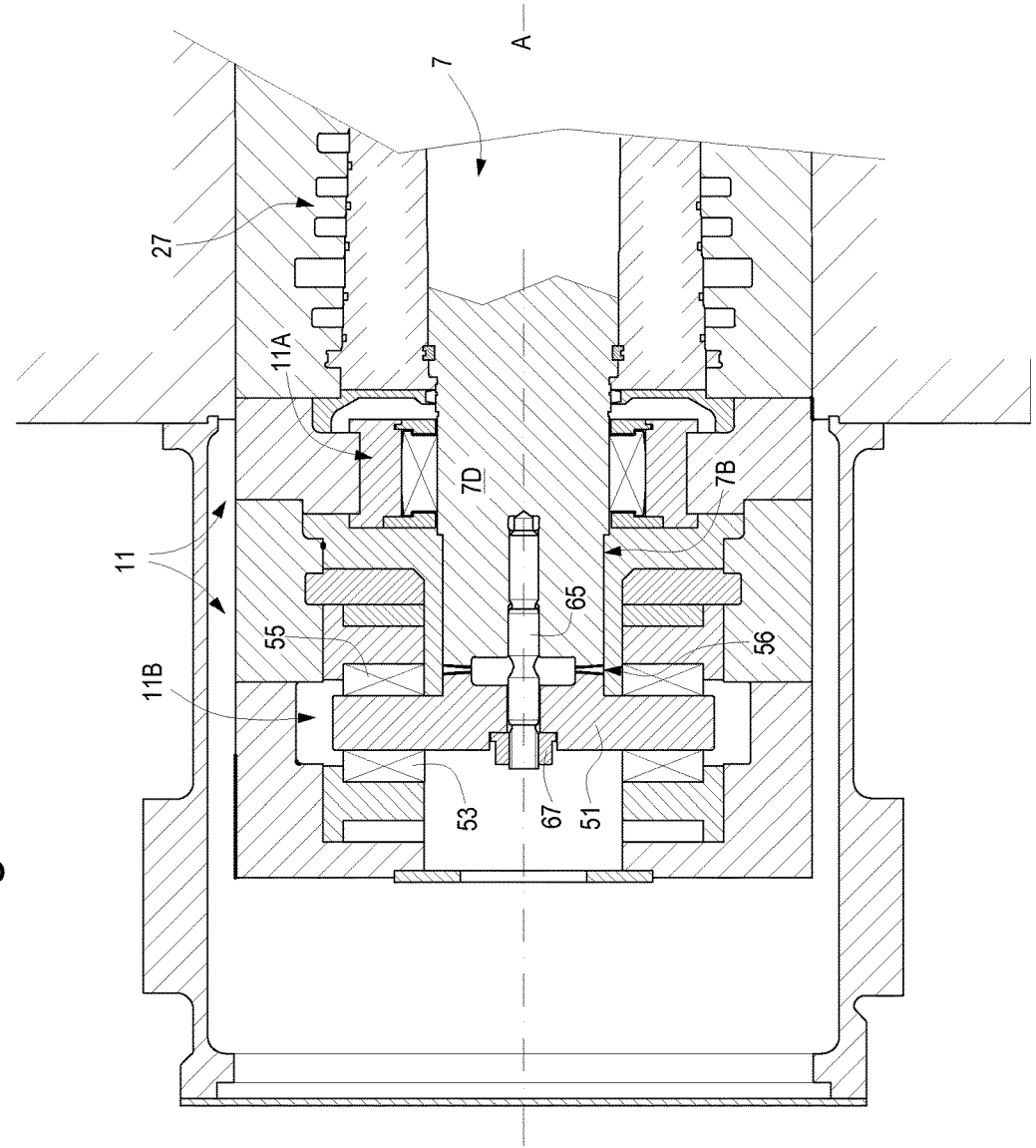

ROTARY MACHINE WITH IMPROVED SHAFT

FIELD OF THE INVENTION

The disclosure in general relates to rotary machines, such as, but not limited to, centrifugal compressors. Embodiments disclosed herein specifically concern improvements to rotary shafts for rotating equipment.

BACKGROUND OF THE INVENTION

Radial or mixed turbomachines usually comprise one or more impellers arranged for rotation in a casing. Each impeller is comprised of a hub and a plurality of blades supported by the hub. The impellers are mounted on a rotary shaft for co-rotation therewith. The shaft is supported for rotation in the casing of the turbomachine by means of bearing arrangements. In so-called in-between bearings machines, the impellers are arranged between two bearing arrangements located at opposite ends of the rotary shaft. The bearing arrangements usually provide radial supporting capability and axial supporting capability, i.e. they withstand radial and axial loads.

One end of the shaft is mechanically coupled to a motion transmission joint. A coupling flange is mounted on the shaft end to provide a mechanical connection between the shaft and the motion transmission joint. This allows mounting on the shaft components having an inner diameter which is smaller than the outer diameter of the coupling flange. The coupling flange is usually axially and torsionally locked on the shaft end by means of radial interference, through a conical interference coupling. This requires the shaft to cantileverly extend by a certain extent beyond the bearing arrangement. The shaft end projecting beyond the bearing arrangement and the mechanical components coupled thereto form an overhung mass, which adversely affects the rotor-dynamic of the rotary shaft. More specifically, the overhanging mass lowers the natural frequency of the critical modes of the shaft, in particular those above the first mode. The critical speeds of higher order cause flexural displacements of the shaft line with nodes located at the bearings thereof, such that the rotor dynamic behavior cannot be improved by acting upon the damping properties of the bearings, since these have no effect whatsoever on at least some of the vibrational modes of higher order, e.g. the fourth natural frequency.

Similar issues arise in connection with the opposite end of the rotary shaft, where a thrust bearing is located beyond a radial bearing. The thrust bearing usually comprises a thrust collar mechanically constrained on the rotary shaft for rotation therewith and co-acting with stationary thrust bearing pads. The mechanical coupling between the thrust collar and the shaft is a radial interference coupling, obtained by means of conical interference surface, which requires a portion of the shaft to cantileverly project from the radial bearing and forming a conical outer surface, whereon the thrust collar is forcedly mounted. This results in a relatively large mass overhanging beyond the radial bearing, which rotates with the shaft and adversely affects the rotor dynamic behavior of the shaft, in particular as far as the natural frequencies of higher order as mentioned above.

The continued operating speed of a rotary machine should be sufficiently distant from the critical modes to avoid the risk of serious machine failures.

On the other hand, there is a continuous trend towards highly performing machines, which achieve high rotational speeds. The critical speeds above the first critical mode represent a limit to the increase of machine performance.

While the above mentioned problems are particularly significant in the design of high-speed turbomachines, such as centrifugal compressors, similar issues may arise in other kinds of rotary machinery, such as electric motors, and in general in machines wherein a coupling flange and/or a thrust collar of a thrust bearing is required to be mechanically coupled to the end of the rotary shaft of the machine, overhanging beyond the respective radial bearing arrangement.

It would be desirable to improve the rotor dynamic behavior of rotary machinery by increasing the stiffness of the rotary shaft thereof, and in particular to increase the natural frequencies of the second and higher order, such that faster spinning speeds and better machine performances can be achieved.

SUMMARY OF THE INVENTION

According to a first aspect, a rotary machine is disclosed, comprising a rotary shaft, a first shaft end, and a second shaft end. The rotary machine further comprises a first bearing arrangement at the first shaft end and a second bearing arrangement at the second shaft end. A coupling flange is mechanically connected to the first shaft end. The coupling flange is mechanically connected to the first shaft end by means of a first axial-contact coupling. In some embodiments, the axial-contact coupling comprises a first Hirth joint, comprised of mutually engaging, axially projecting teeth. In other embodiments, a friction coupling between mutually abutting friction surfaces can be provided.

According to a further aspect, a rotary machine is disclosed comprising a rotary shaft having a rotation axis, a first shaft end and a second shaft end. The rotary machine further comprises a first bearing arrangement at the first shaft end and a second bearing arrangement at the second shaft end. The second bearing arrangement comprises a thrust bearing comprised of a thrust collar, mounted for co-rotation with the rotary shaft and co-acting with stationary pads circularly arranged about the rotation axis of the rotary shaft. The thrust collar is mechanically coupled to the second shaft end by means of an axial-contact coupling, for instance comprised of a Hirth joint.

According to a yet further aspect, a rotary machine shaft is disclosed herein, comprising a first shaft end and a second shaft end. The shaft comprises a first bearing portion, at the first shaft end thereof, configured and arranged for support in a first radial bearing, the first shaft end extending beyond the first bearing portion. A second bearing portion is further provided at the second shaft end, configured and arranged for support in a second radial bearing, the second shaft end extending beyond the second bearing portion. A first surface of a first axial-contact coupling is formed on one at least one of the first shaft end and second shaft end. In some embodiments a surface of a first axial-contact coupling and a surface of a second axial-contact coupling can be provided at the first end and second end of the shaft, respectively. The first and/or the second surface can be comprised of radially extending, axially projecting teeth of a Hirth joint.

As will become apparent from the following description of detailed embodiments of the subject matter disclosed herein, the use of an axial-contact coupling at one or both ends of the shaft reduces the overall length and weight of portions of the shaft overhangingly projecting from the radial bearings, thus positively affecting the rotor dynamic of the shaft and of the rotary machine wherein the shaft is arranged, making it possible to assemble rotor components, such as for instance and without limitation impellers, bearings or seals, having a diameter which is lower than the outer diameter of the coupling flange or of the thrust collar.

The critical speeds of the shaft above the first critical speed can be increased, allowing safe operation of the machine at higher rotational speeds.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 3 illustrates an enlargement of a first end of the rotary shaft of FIG. 2;

FIG. 3A illustrates an enlargement of a detail of FIG. 3;

FIG. 4 illustrates an enlargement of a second end of the rotary shaft of FIG. 2;

FIG. 4A illustrates an enlargement of a detail of FIG. 4.

DETAILED DESCRIPTION

The following detailed description of exemplary embodiments refers to the accompanying drawings. The same reference numbers in different drawings identify the same or similar elements. Additionally, the drawings are not necessarily drawn to scale. Also, the following detailed description does not limit embodiments of the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

The following description specifically relates to applications of the subject matter disclosed herein in combination with turbomachines, such as in particular centrifugal compressors. However, the scope of the disclosure is not limited to such machinery. Those skilled in the art will appreciate that applications to other rotary machines and equipment are possible, where similar problems arise in connection with the natural frequencies of the rotating components and which can be at least partly alleviated by using the teaching of the present disclosure.

Figure 1:
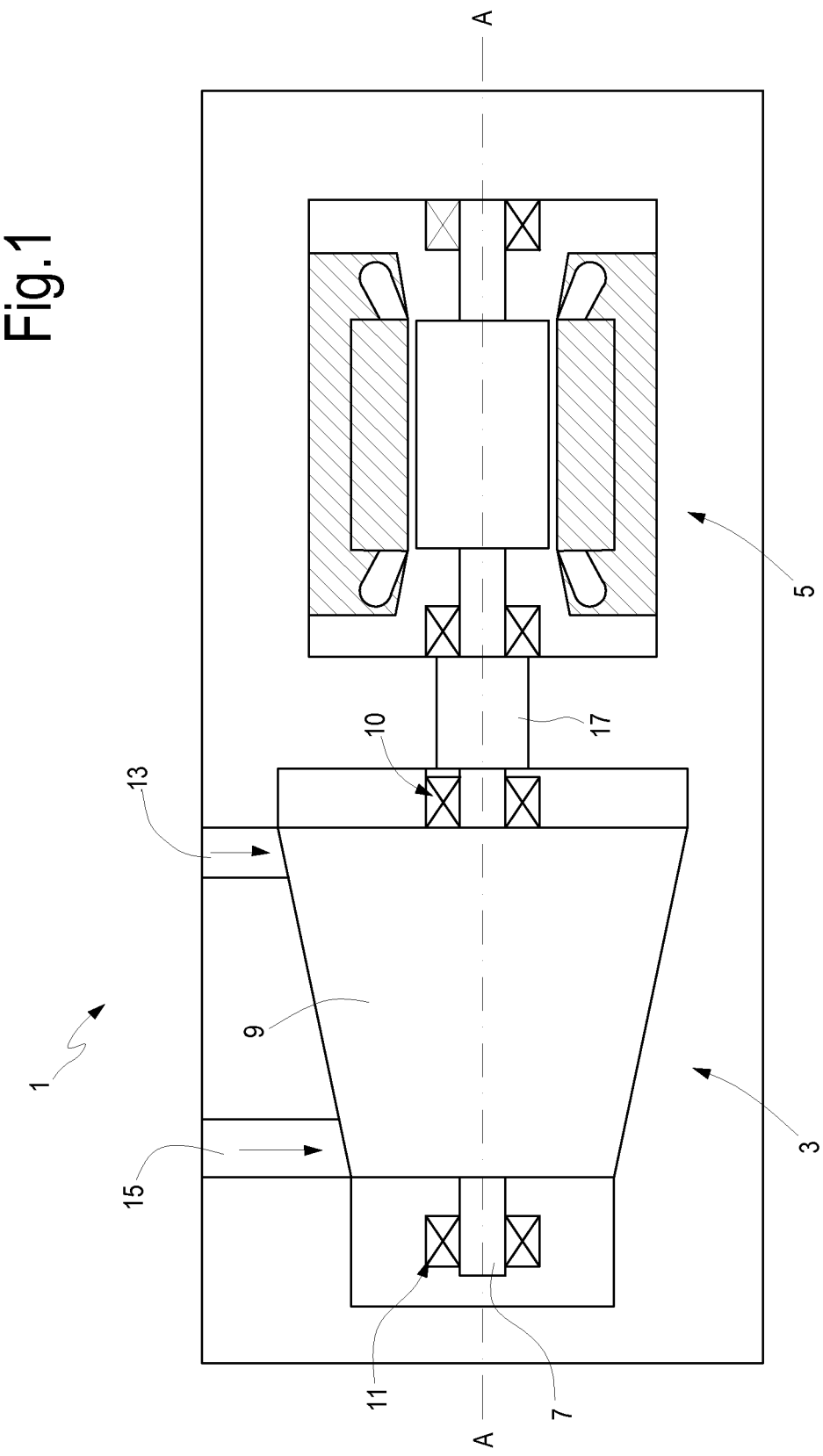
FIG. 1 schematically illustrates a motor-compressor unit, wherein the subject matter disclosed herein can be incorporated.

In FIG. 1 a motor-compressor unit 1 is schematically shown, which includes a compressor 3, e.g. a centrifugal, high-speed compressor, and a driver, e.g. an electric motor 5. The centrifugal compressor 3 comprises a rotary shaft 7 supported in a compressor casing 9 for rotation around a rotation axis A-A by means of a first bearing arrangement 10 and a second bearing arrangement 11. Reference numbers 13 and 15 indicate a compressor inlet and a compressor outlet, respectively. The rotary shaft 7 is mechanically coupled to the electric motor 5 by means of a motion transmission joint 17, for instance a flexible motion transmission joint.

In FIG. 1 the compressor 9 is represented schematically. A possible embodiment of a centrifugal compressor which can be used in the unit 1 of FIG. 1 is shown in some more detail in a sectional view in FIG. 2. By way of example only the compressor 9 of FIG. 2 comprises two sections in a back-to-back configuration. Each section comprises a plurality of stages, the impellers whereof are arranged in a back-to-back relationship in order to reduce the axial thrust on the shaft.

Figure 2:
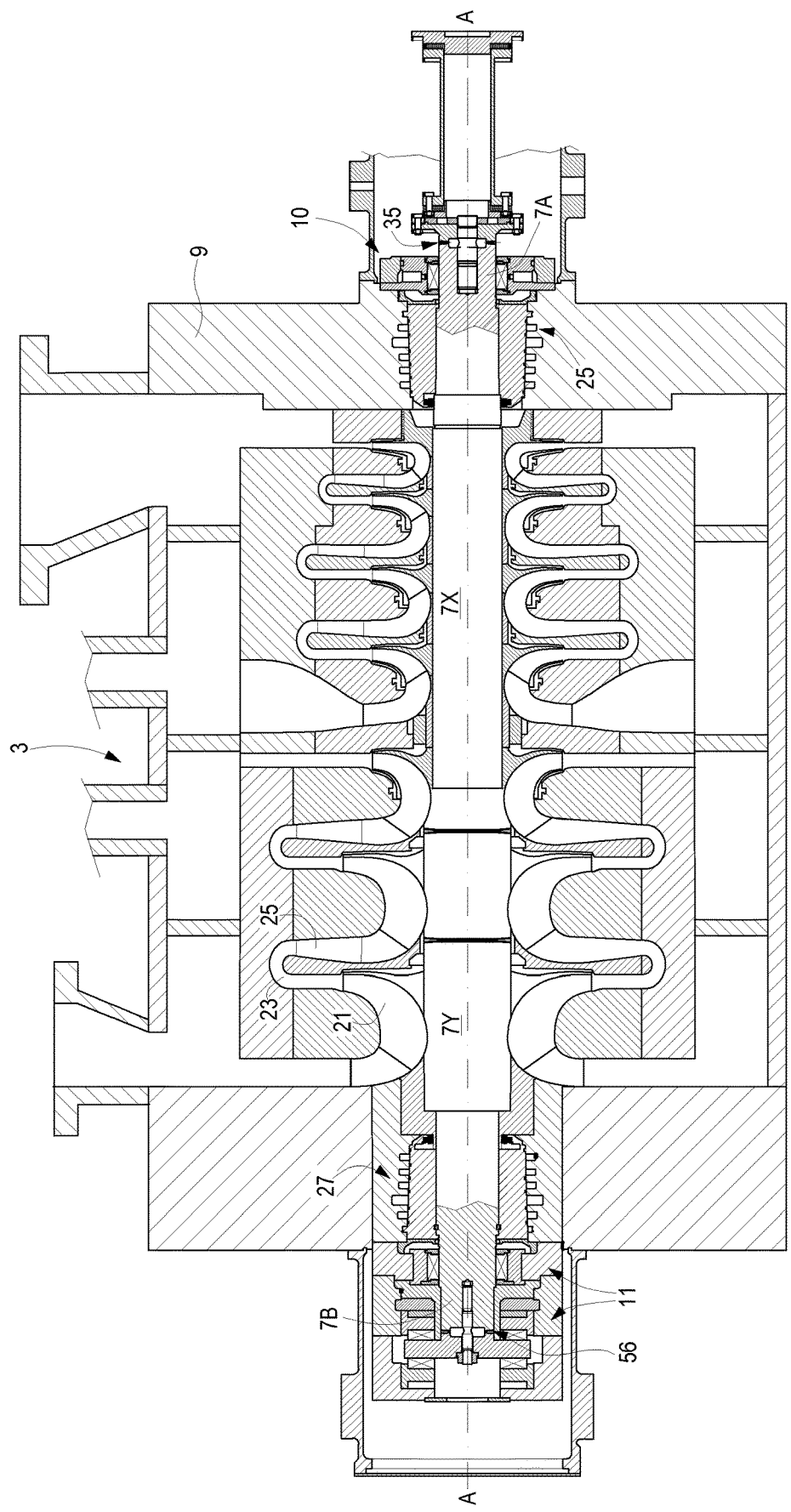
FIG. 2 illustrates a sectional view of an exemplary centrifugal compressor which can be used in a unit according to FIG. 1, and which is comprised of a rotary shaft and relevant impellers, as well as end bearing arrangements for the shaft.

As better shown in FIG. 2, the rotary shaft 7 can be comprised of one or more shaft portions 7X, 7Y, which can be axially and torsionally locked to one another.

In the exemplary embodiment disclosed herein, referring to FIG. 2 with continuing reference to FIG. 1, a plurality of impellers 21 are mounted on the rotary shaft 7 between the first bearing arrangement 10 and the second bearing arrangement 11. In a manner known to those skilled in the art and not described in detail herein, diffusers 23 and return channels 23, schematically shown in FIG. 2, are provided in the casing 9, which define a flow path for the fluid processed by compressor 3. A first shaft end 7A is supported in the first bearing arrangement 10 and a second shaft end 7B is supported in the second bearing arrangement 11.

In the exemplary embodiment of FIG. 2, the first shaft end 7A is arranged at the drive end side of the compressor 3, i.e. the side of the compressor which is mechanically coupled to the electric motor 5. The second shaft end 7B is arranged at the non-drive end side of the compressor 3, i.e. the side opposite the electric motor 5.

Sealing members, such as dry-gas sealing arrangements schematically shown at 25, 27 are provided in the compressor casing 9, to reduce or prevent fluid leakages from the interior of compressor 3 towards the bearing assemblies 10 and 11.

Referring now to FIGS. 3 and 3A, with continuing reference to FIGS. 1 and 2, according to some embodiments the first bearing arrangement 10 comprises a first radial bearing, for instance a hydrodynamic radial bearing 10A, which is located adjacent the first shaft end 7A. The rotary shaft 7 comprises a bearing portion 7C forming a journal co-acting with bearing shoes of the radial bearing that surround the journal. The first shaft end 7A projects with an overhanging terminal portion beyond the radial bearing 10A and the journal 7C.

A coupling flange 31 is mechanically connected to the first shaft end 7A. The coupling flange 31 has an outer flange diameter D31 which is larger than the outer diameter D7A of the first shaft end 7A. Connection members 33, such as bolts or the like, can be circularly arranged about the rotation axis A-A of the compressor 9, for mechanically connecting the coupling flange 31 to the motion transmission joint 17. This latter can be comprised of a rigid central bush-shaped member 17A, which is connected, through axially spaced resilient members 17B, 17C, to respective end rings 17D, 17E. The ring 17D is in turn mechanically coupled to the coupling flange 31.

The coupling flange 31 is mechanically coupled to the first shaft end 7A by means of an axial-contact coupling. According to the embodiment shown in FIGS. 3 and 3A, the axial-contact coupling is comprised of a Hirth joint 35. The mechanical axial-contact coupling embodied by the Hirth joint is best shown in the enlargement of FIG. 3A, where the first shaft end 7A and the coupling flange 31 are shown in isolation and separate from one another.

In the embodiment of FIGS. 3, 3A, the first shaft end 7A is provided with a first annular front surface 37, whereon a first set of radial teeth 39 is formed. The coupling flange 31 is in turn comprised of a second set of radial teeth 41 formed on a second annular front surface 43. The radial teeth 39 and 41 mesh with one another, forming the Hirth joint 35. The outer diameter of the first annular front surface 37 and the outer diameter of the second front surface 43 can be identical, as shown in the exemplary embodiment illustrated in the figures, where said outer diameter is labeled D35. The outer diameter D35 is smaller than the outer diameter of the outer flange diameter D31.

The coupling flange 31 can be mounted on the first shaft end 7A by means of a tie rod 45 and a ring nut 47 (FIG. 3). The end portions of the tie rod 45 are threaded. A first end portion is treadedly engaged in a threaded axial hole of shaft 7, while a second end portion of the tie rod 45 is threadedly engaged by the ring nut 47. The tie rod 45 and ring nut 47 axially press the radial teeth 39 and the radial teeth 41 in meshing engagement with one another.

The axial-contact coupling provided by the Hirth joint 35 in combination with the coupling flange 31 provide a mechanical coupling between the rotary shaft 7 and the motion transmission joint 17. By means of the axial-contact mechanical coupling between shaft 7 and motion transmission joint 17, the shaft end 7A is made substantially shorter than shaft ends of the current art, which are required for mechanical coupling using a radial interference involving conical interference surfaces.

According to some embodiments, compared with current art couplings, the other dimensions being the same, the use of a Hirth joint can reduce the length of the shaft portion overhangingly projecting beyond the first bearing arrangement 10 by around 38%, which in turn reduces the overhanging mass (i.e. the mass of the shaft end portion projecting in an overhanging fashion from the first bearing arrangement 10) by around 49%. An increase of the fourth natural frequency of the rotary shaft 7 can thus be obtained, such that the centrifugal compressor 3 can rotate at a higher speed without reaching the fourth critical speed. Similar results can be achieved also with other axial-contact couplings, e.g. using simple friction surfaces, rather than a Hirth joint. This latter, however, is particularly advantageous since the teeth of the Hirth joint allow a high torque to be transmitted through the joint.

Referring now to FIG. 4, with continuing reference to FIG. 2, adjacent the second shaft end 7B the rotary shaft 7 is supported by the second bearing arrangement 11, which can comprise a second radial bearing, for instance a hydrodynamic radial bearing 11A. The rotary shaft 7 can be comprised of a bearing portion 7D forming a journal which co-acts with shoes of the hydrodynamic radial bearing 11A. The second shaft end 7B projects with an overhanging terminal portion beyond the radial bearing 11A and the journal 7D.

The second bearing arrangement 11 can further comprise a thrust bearing, i.e. an axial bearing, labeled 11B. The thrust bearing comprises a thrust collar 51 mounted on the second end 7B of rotary shaft 7 for co-rotation with rotary shaft 7, and co-acting with stationary pads 53, 55 supported in a bearing housing. The thrust collar 51 is mechanically coupled to the second shaft end 7B by means of a respective axial-contact coupling. According to embodiments, the axial-contact coupling comprises a Hirth joint 56. The thrust collar 51 has an outer diameter D51, which can be larger than the diameter of the shaft end 7B.

FIG. 4A illustrates an enlargement of the thrust collar 51 and of the terminal portion of the shaft end 7B in a disassembled condition. As best shown in FIG. 4A, according to some embodiments the Hirth joint 56 comprises a set of radial teeth 57 formed on an annular front surface 59 provided at the second shaft end 7B. The Hirth joint 56 further comprises a further set of radial teeth 61 formed on a further annular front surface 63 formed on the thrust collar 51. The sets of radial teeth 57, 61 are configured for meshing with one another and mounted in meshing engagement by means of a tie rod 65 and a nut 67, which threadedly engages the tie rod 65, such that the radial teeth 57 and the radial teeth 61 are pressed in mechanical engagement with one another.

The Hirth joint 56 has an outer diameter D56 which is larger than the outer diameter D51 of the thrust collar 51.

By using an axial-contact coupling, instead of a radial interference coupling of the current art, for coupling the thrust collar 51 to the second shaft end 7B, the length of the shaft end portion, which overhangingly projects beyond the second bearing arrangement 11, becomes substantially shorter.

According to some embodiments, compared with current art couplings, the other dimensions being the same, the use of an axial-contact coupling, e.g. provided by a Hirth joint for connecting the thrust collar 51 to the rotary shaft 7 can reduce the length of the shaft portion projecting beyond the second bearing arrangement 11 by around 23%, which in turn reduces the overhanging mass (i.e. the mass of the shaft end portion projecting in an overhanging fashion from the second bearing arrangement 11) by around 19%. An increase of the fourth natural frequency of the rotary shaft 7 can thus be obtained.

Even though in the embodiment described herein two axial-contact couplings, both embodied by Hirth joints 35, 56 are used in order to reduce the overhanging mass on both the drive end side and the non-drive end side of the centrifugal compressor 3, those skilled in the art will understand that advantages in terms of rotor dynamic and increase of the natural speeds of the higher order (above the first critical speed) of the rotary shaft 7 can be achieved also if only one axial-contact coupling is used, e.g. on the first shaft end 7A, or else only on the second shaft end 7B, the other shaft end being provided with a radial interference coupling using a conical interference connection according to the current art. Best performances are obtained, if both the first shaft end 7A and the second shaft end 7B are provided with axial-contact couplings for connecting the coupling flange 31 and the thrust collar 51 to the rotary shaft ends 7A and 7B, respectively.

It shall also be understood that, while in the above description and in the drawings both axial-contact couplings are embodied by Hirth joints, in other embodiments two different axial-contact couplings can be used instead, for instance a Hirth joint at one end and an axial friction contact at the other.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A rotary machine comprising:
    a rotary shaft comprising a rotation axis, a driven shaft end, and a non-driven shaft end;
    stationary pads circularly arranged about the rotation axis of the rotary shaft;
    bearings disposed at the driven shaft end and the non-driven shaft end, the bearings comprising a radial bearing and a thrust bearing, the thrust bearing comprising a thrust collar mounted for co-rotating with the rotary shaft and co-acting with the stationary pads;
    on the driven shaft end,
        a coupling flange; and
        a first axial-contact coupling mechanically connecting the coupling flange to the driven shaft end, the first axial-contact coupling comprising a first Hirth joint with radial teeth formed on an annular front surface of the driven shaft end and radial teeth formed on an annular surface of the thrust collar on the driven shaft end; and
    on the non-driven end,
        a second axial-contact coupling connecting the thrust collar to the non-driven shaft end, the second axial-contact coupling comprising a second Hirth joint including radial teeth formed on an annular front surface of the non-driven shaft end and radial teeth formed on an annular surface of the thrust collar on the non-driven shaft end, and
    tie-rods that reside in the shaft on both the driven shaft end and the non-driven shaft end,
    wherein the radial teeth on the driven shaft end and the non-driven shaft end mesh with one another when pressed together in mechanical engagement due to threaded engagement between the tie-rods and threaded nuts.

2. The rotary machine of claim 1, wherein the coupling flange has an outer flange diameter greater than a diameter of the first shaft end.

3. The rotary machine of claim 1, wherein the rotary shaft supports centrifugal impellers disposed between the bearings on the driven shaft end and the non-driven shaft end, the rotary machine being a centrifugal compressor.

4. The rotary machine of claim 1, wherein the coupling flange comprises connection members for mechanical connection to a motion transmission joint.

5. The rotary machine of claim 1, wherein a tie rod and ring nut arrangement axially presses the coupling flange against the rotary shaft.

6. The rotary machine of claim 1, wherein the thrust collar on the driven end is mounted on a shaft portion overhanging from a the radial bearing.

7. The rotary machine of claim 1, wherein the first axial contact coupling comprises a rigid bush-shaped member connected via axially spaced resilient members to respective end rings that mechanically coupled to the coupling flange.

* * * * *